Patented Feb. 20, 1940

2,190,909

UNITED STATES PATENT OFFICE 2,190,909

PROCESS FOR MAKING FIBROUS MOLDED PRODUCTS AND MATERIALS

Max Phillips, Evansville, Wis., and Marshall J. Goss, Ashland, Ohio; dedicated to the free use of the People of the United States of America No Drawing. Application June 7, 1938, Serial No. 212,304

6 Claims. (Cl. 106—40)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people of the United States of America to take effect on the granting of a patent to us.

It is already known that when wood flour or materials of a similar character are mixed with various synthetic resins and the resulting mixture subjected to hydraulic pressure, that products having useful properties may thus be obtained. We have found that when various lignified materials are treated in a manner so as to reactivate the lignin, which is the natural cementing material of all lignified plant tissues, it is possible to obtain useful fibrous molded products and materials. Our process differs from previous ones in that we add no cementing or binding material but depend entirely on the cementing properties of reactivated lignin.

The structural tissues of higher plants consist essentially of cellulose, hemicellulose, and lignin. The function of the lignin is to cement the fibers together and to give strength and rigidity to those parts of the plant requiring it. Lignin may thus be considered as a natural cementing material. Lignin is found in the trunks of trees and shrubs, in stalks, stems, straws, cobs, hulls, and leaves. While the lignin thus binds the fibers of the plant together, nevertheless, it is found that when lignin is isolated from the plant material by the ordinary methods, such as, the fuming hydrochloric acid method of Willstätter and Zechmeister, the 72% sulphuric acid method, or the alkali method, it no longer possesses cementing or adhesive properties. Lignin may thus be likened to mortar which is used to cement bricks together. After the cement has set it holds the bricks together with considerable force. However, the cement thus set when separated mechanically from the bricks can no longer be used as a cementing material. This material must be processed and converted into active form before it can be used again as a cement. We have found that when various lignified materials, such as, ground wood, wood wastes of various kinds, straw hulls, cobs, stalks, leaves, and materials of a similar character, are treated with various alcohols, in the presence of a catalytic agent, under conditions hereinafter described, that the lignin in these materials become reactivated and again function as a cementing material. By means of our process it is possible to prepare fibrous molded products and materials from wood flour, wood wastes, and from agricultural by-products, such as, straw, stalks, leaves, hulls and cobs without the use of synthetic resin or any other artificial material as a binder.

Examples of the manner in which this invention may be practiced are given immediately following, but it is to be understood that we do not limit ourselves to any particular temperature, pressure, catalyst, or lignified material:

*Example 1.*—Fifty pound of wheat straw, cut in one-inch length; 200 lbs. 95% ethyl alcohol; and 5 lbs. concentrated hydrochloric acid are heated in an autoclave at 150–160° C. for two hours. The excess alcohol is distilled off and the residual straw pressed in an hydraulic press under a pressure of 16,000 pounds to the square inch.

*Example 2.*—One hundred pounds of ground rye straw, 200 pounds methyl alcohol, and 2 pounds concentrated hydrochloric acid are heated in an autoclave at 100° C. for 5 to 6 hours. The excess alcohol is then distilled off and the residual material subjected to hydraulic pressure as described under Example 1.

While in the above examples wheat and rye straws were employed, other lignified materials such as, wood, stalks, leaves, cobs, and hulls may be used. Also, alcohols, other than methyl and ethyl alcohols, and alcohols containing a greater number of carbon atoms than either methyl alcohol or ethyl alcohol may be used, such as, the propyl and butyl alcohols. Sulphuric, hydrobromic, and phosphoric acids may also be employed instead of hydrochloric acid. The temperatures of 100° C. and 150–160° C. employed in the above examples are not critical and it is to be understood that this invention is not limited to these temperatures. Any temperature at or above the boiling point of the alcohol employed may be used.

Having thus described our invention, we claim:

1. The process for manufacturing a fibrous molded product comprising activating the lignin of a lignin-containing material by heating the material with alcohol in the presence of an acid catalyst, thence removing the chemically uncombined alcohol whereby the lignin is retained in an activated condition, and thence hardening the resulting material under pressure.

2. The process for manufacturing a fibrous molded product comprising activating the lignin of a material chosen from the group consisting of straw, stalks, wood, leaves, stems, cobs, and hulls by heating the material with alcohol in the presence of an acid catalyst, thence removing the chemically uncombined alcohol whereby the lignin is retained in an activated condition, and thence hardening the resulting material under pressure.

3. The process for manufacturing a fibrous molded product comprising activating the lignin of a lignified material by heating the material with alcohol at or above the boiling point of the alcohol in the presence of hydrochloric acid, thence removing the chemically uncombined alcohol whereby the lignin is retained in an activated condition, and thence hardening the resulting material under pressure.

4. The process for making a fibrous molded product comprising activating the lignin of a lignified material by heating the material with ethyl alcohol at a temperature of 150° to 160° C., thence removing the chemically uncombined alcohol whereby the lignin is retained in an activated condition, and thence hardening the resulting material under pressure.

5. The process for making a fibrous molded product comprising activating the lignin of a lignified material by heating the material with methyl alcohol at about 100° C. in the presence of an acid catalyst, thence removing the chemically uncombined alcohol whereby the lignin is retained in an activated condition, and thence hardening the resulting material under pressure.

6. The process for manufacturing a fibrous molded product comprising heating a lignified material with alcohol in the presence of an acid catalyst until the lignin becomes activated, thence removing the chemically uncombined alcohol whereby the lignin is retained in an activated condition, and thence molding the resulting lignocellulosic-hemicellulosic material under pressure.

MAX PHILLIPS.
MARSHALL J. GOSS.